US006524703B1

(12) United States Patent
Court

(10) Patent No.: US 6,524,703 B1
(45) Date of Patent: Feb. 25, 2003

(54) DECORATIVE VITREOUS BEADS AND PRODUCTS AND METHODS OF MAKING SAME

(76) Inventor: Caroline B. Court, Box 32795, Detroit, MI (US) 48232

( * ) Notice: Subject to any disclaimer, the term of this patent is extended or adjusted under 35 U.S.C. 154(b) by 74 days.

(21) Appl. No.: 09/672,918

(22) Filed: Sep. 28, 2000

(51) Int. Cl.[7] .................................................. B32B 5/16
(52) U.S. Cl. ...................... 428/402; 428/404; 428/406; 264/5; 264/6; 264/43; 264/56; 264/140; 501/4; 501/27; 501/32; 501/33; 501/53; 501/55; 501/72
(58) Field of Search .................................. 428/402, 404, 428/406; 264/43, 5, 6, 56, 140; 501/4, 27, 32, 33, 53, 55, 72

(56) References Cited

U.S. PATENT DOCUMENTS

| | | | |
|---|---|---|---|
| 457,231 A | 8/1891 | Stevens | 264/112 |
| 610,776 A | 9/1898 | Thomson | 428/143 |
| 1,856,906 A | 5/1932 | Carvel | 264/256 |
| 2,334,307 A | 11/1943 | Bauer | 264/643 |
| 2,871,132 A | 1/1959 | Hammel | 501/144 |
| 3,208,900 A | 9/1965 | Inklaar | 428/138 |
| 3,737,511 A | 6/1973 | Dillon | 264/256 |
| 3,983,677 A | 10/1976 | Lundbom | 53/415 |
| 4,261,938 A | 4/1981 | Engstrom et al. | 264/43 |
| 4,337,317 A | 6/1982 | Beard | 501/142 |
| 4,818,731 A | 4/1989 | Mizutani et al. | 514/386 |
| 4,915,888 A | 4/1990 | Sato | 264/71 |
| 5,352,120 A * | 10/1994 | Hambright | 434/95 |
| 5,868,993 A | 2/1999 | Mintchenko et al. | 264/602 |
| 5,958,535 A * | 9/1999 | Desmet | 428/36.91 |
| 6,045,913 A | 4/2000 | Castle | 428/403 |
| 6,258,456 B1 | 7/2001 | Meyer | 428/403 |
| 6,287,681 B1 | 9/2001 | Mehta et al. | 428/323 |

OTHER PUBLICATIONS

Material Safety Data Sheet, MSDS No. 018–UC; Oct., 1998.
Pemco International Material Safety Data Sheet; Oct. 1, 1997 Product Code: OI94.
Pemco International Material Safety Data Sheet; Oct. 1, 1997 Product Code: ON37.
Pemco International Material Safety Data Sheet; Apr. 19, 1999 Material Name: P–930; ID: PM–0059.

* cited by examiner

*Primary Examiner*—Leszek Kiliman
(74) *Attorney, Agent, or Firm*—Dykema Gossett PLLC

(57) ABSTRACT

The decorative vitreous beads of the present invention have a hard, solid, substantially vitreous, unitary body comprised primarily of silica and having a generally spherical form, with the largest dimension being in the range between ⅛ inch to 2 inches. The body by weight comprising 35% to 70% of silica and the remaining ingredients by weight are from 65% to 30% for a total of 100% taken from the group comprising potash, soda, calcia, strontia, alumina, zinc oxide, boric oxide, zirconia, magnesia and potassium. Methods are further disclosed for making the decorative beads comprising mixing together a batch of minerals in powder state comprising by weight 35% to 70% of silica and the remaining oxides by weight from 65% to 30% for a total of 100% taken from a group comprising the oxides mentioned previously. The mixed batch is placed in the container which is inserted into a kiln.

23 Claims, 2 Drawing Sheets

DECORATIVE VITREOUS BEADS AND PRODUCTS AND METHODS OF MAKING SAME

BACKGROUND OF THE INVENTION

1. Field of the Invention

The present invention is directed to pottery or ceramics and more particularly to the materials, techniques and methods for preparing decorative vitreous beads and products. The methods may be used by a large number of persons, both skilled and unskilled, young and old, in order to decorate ceramic architectural materials, ceramic ware of all kinds and other plastic materials which harden at ambient temperature. The methods include the step of adding colorants during the manufacture or mixing of the materials used to create the vitreous beads.

2. Description of the Prior Art

U.S. Pat. No. 457,231 (Stevens) discloses a mold or box and a method for forming a face of plastic material from which artificial stone is to be made, to simulate the appearance of rough-hewn blocks of natural stone.

U.S. Pat. No. 610,776 (Thomson) discloses a tile having a body A made from opal or glass and at one side thereof, a paint product B to which are applied hard materials C. The materials C may be limestone or small pieces of granite, marble, feldspar, wood or other materials.

U.S. Pat. No. 1,856,096 (Carvel) discloses concrete wall sections and a method of forming same including a mold or box 1 in which is placed a layer of sand 2. Individual stones or other facing materials 3 are embedded in the sand, with portions thereof spaced apart by separating strips of rubber or other flexible material 4. Concrete 5 is poured into the box as illustrated in FIG. 2. After the concrete has set, the mold is removed from the concrete product (FIG. 3) to provide a concrete wall section with a layer of individual stones 3 at one side thereof.

U.S. Pat. No. 2,334,307 (Bauer) relates to chinaware and pottery and more particularly to a method or process of incorporating brazed decorative designs on the surfaces of the pottery in an integral manner.

U.S. Pat. No. 2,871,132 (Hammel) relates to a glazing composition for structural clay products and the process for making same. Different color glazed batches are compounded, each consisting of clear glaze composition such as is set forth in Example 1 plus a glazed stain as an additive. The stains may be of different colors. Various firing temperatures and time periods are disclosed.

U.S. Pat. No. 3,208,900 (Inklaar) discloses a method of manufacturing a decorated molded article from a powered thermoplastic material.

U.S. Pat. No. 3,737,511 (Dillon) discloses a method of producing an ornamental concrete surface wherein particulate rock particles 16 are bonded to a concrete surface. The particles 16 may comprise any number of materials such as rock chips, wood chips, metal chips and regular and irregular configured particles of synthetic materials.

U.S. Pat. No. 3,983,677 (Lundbom) relates to a method of making candles including methods to decorate the candles with rocks or stones 13.

U.S. Pat. No. 4,261,938 (Engstrom et al) discloses a method for producing foam ceramic bodies, with the starting composition including natural minerals such as feldspar, glacial clay, quartz, diabase, nepheline syenite, kaolin, or mixtures thereof, for example, sand.

U.S. Pat. No. 4,337,317 (Beard) relates to a method for making clayware and in particular to the use of flux such as feldspar, nepheline syenite and cornish stone. The various examples include the firing temperatures and time periods.

U.S. Pat. No. 4,818,731 (Mizutani et al) relates to a method for making an artificial stone including a method for method for manufacturing a colored frit.

U.S. Pat. No. 4,915,888 (Sato) relates a method of making a concrete block having decorative stones 2 embedded in a surface thereof.

U.S. Pat. No. 5,868,993 (Mintchenko et al) discloses a process for applying color to an article made of clay. The color can be applied to articles such as pottery, earthenware, figurines, ceramics, porcelains, china, tiles and decorative roofings.

SUMMARY OF THE INVENTION

A feature of the invention is to provide a decorative bead which has a hard, solid, substantially vitreous, unitary body comprises primarily of silica, and having a generally spherical form, with the largest dimension being in the range between ⅛ inch to 2 inches.

Another feature of the present invention is to provide a decorative bead which has long term durability when used externally in a severe freeze-thaw climate.

Still another feature of the present invention is to provide a decorative bead which is safe and is easy for persons of all ages and skill levels to utilize in order to decorate ceramic architectural materials, ceramic ware of all kinds and other plastic materials which harden at ambient temperature.

A further feature of the present invention is to provide a decorative bead which is brilliant, clear and has lasting colors when colorants are added to the materials of the bead.

A still further feature of the present invention is to provide decorative beads which have interesting shapes and configurations and have consistent quality over the firing range of from Cone 06 to Cone 5.

Another feature of the present invention is to provide a decorative bead where the hardness of the unitary body is in the range of 5 to 6 on the Mohs' Scale of Hardness.

Still another feature of the present invention is to provide decorative beads which can be easily applied in a large variety of clays, shale and bodies thereof.

A still further feature of the present invention is to provide a decorative bead wherein the body comprises by weight 35% to 70% of silica and the remaining ingredients by weight from 65% to 30% for a total of 100% taken from the group comprising potash, soda, calcia, strontia, alumunina, zinc oxide, boric oxide, zirconia, magnesia and potassium.

Another feature of the present invention is to provide a decorative bead wherein one or more colorants are added to the silica body utilizing coloring oxides, carbonates or prepared stains.

A further feature of the present invention is to provide a method of making decorative vitreous beads comprising the steps of mixing together a batch of materials in powered state, comprising by weight 35% to 70% of silica and the remaining oxides by weight from 65% to 30% for a total of 100% taken from the group comprising potash, soda, calcia, stronia, alumunina, zinc oxide, boric oxide, zirconia, magnesia and potassium; placing the batch in a container and inserting the container into a kiln; subjecting the batch and the container to a first firing to increase overtime the temperature to be within a range from 1500° F. to 2100° F. thereby transforming the batch from the powdered state into a hardened state; and breaking the hardened batch into small hardened forms having their largest dimension in the range between ⅛ inch to 2 inches.

A still further feature of the present invention is to provide a method where the hardened forms are embedded in a ceramic substrate and the ware is placed in the kiln; or the hardened forms are placed themselves on washed shelves of the kiln; and subjected to a firing to increase the temperature to a range of from 1825° F. to 2200° F., thereby bonding the hardened forms to the substrate in the case of ware, and in all cases transforming the beads into generally spherical forms.

Another feature of the present invention is provide a method of the aforementioned types wherein colorants are added to the batches prior to mixing of the minerals in the powered state.

A description of the preferred embodiments follow. It will be understood that these best mode description do not limit the scope of the present invention. The scope of the present invention is identified in the claims appended hereto.

DESCRIPTION OF THE PREFERRED EMBODIMENTS

Figures 1, 2:
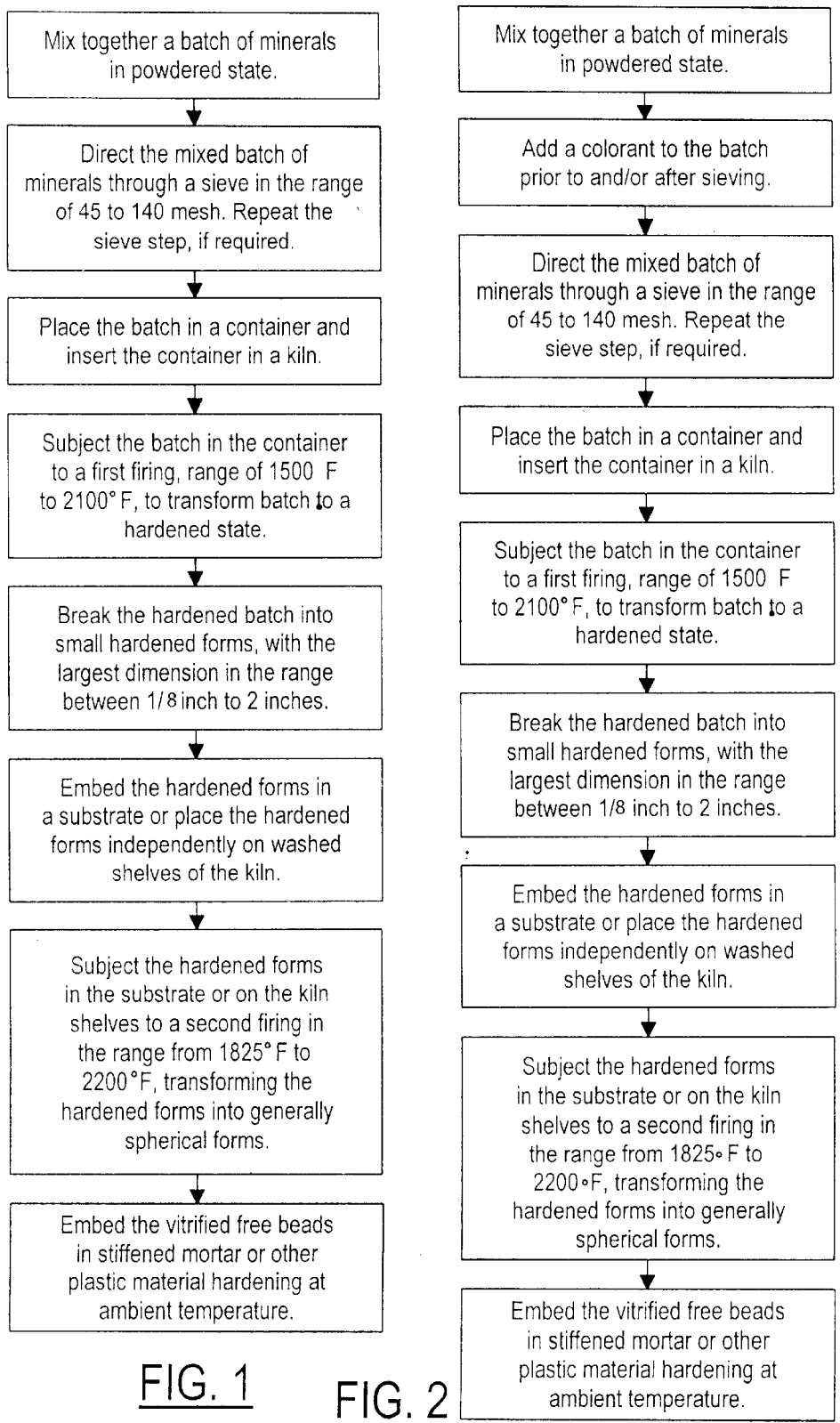
FIG. 1 is a flow chart indicating the method steps of one embodiment of the present invention.
FIG. 2 is another flow chart indicating the method steps of another embodiment.

Although the disclosure hereof is detailed to enable those skilled in the art to practice the invention, the embodiments identified herein merely exemplify the present invention.

The first step in formulating decorative vitreous beads is to mix specific ceramic ingredients or minerals in the powered state with the desired colorants, if any, and thereafter directing the resultant mix through a sieve in the range of 45 to 140 mesh. After the mixture of the minerals or ingredients in powered state has been prepared, the mixed material is placed in a terra cotta pot or other suitable container and is formative fired in a kiln. The batch in the container is subjected to a first firing to increase over time the temperature to be within a range of 1500° F. to 2100° F. thereby transforming the batch from the powered state to a hardened state. The hardened batch is removed from the container and is broken. The pieces or units are of irregulated size, as an example, from ⅛ inches to 2 inches. The hardened forms are thereafter pressed into articles made of clay and final fired or are placed on a well-washed kiln shelf and the hardened forms are thereafter subjected to a second or final firing to increase over time the temperature to a range from 1825° F. to 2200° F. thereby transforming the hardened forms into generally spherical forms. When the hardened forms are placed on the washed kiln shelf and subjected to the final firing as described previously, they can thereafter be pressed into mortar, plastic or other materials which matures or hardens at ambient temperatures.

The basic ingredient of the decorative vitreous beads is feldspar which contains alkalis, silica, alumina and are therefore frits or glazes. The alkalis are notably potash and soda. The feldspar is taken from the mineral group comprising orthoclase, soda orthoclase, albite, oligoclase, andesine, labradorite, bytownite, anorthite, hyalophane, celsian, microcline and soda microcline. The feldspar selected supplies the silica and alumina to form the glassy vitreous structure of the bead and the alkalis help with the melting of the structure during the formation of the beads.

The Unimin Corporation of New Canaan, Conn. and Zemex Industrial Minerals of Atlanta, Ga. have available soda feldspar or albite having the formulation $Na_2Al_2O_3.6SiO2$. The mean values of the soda feldspar used in the present invention are as follows:

| Chemical Analysis - Mean Values | | |
|---|---|---|
|  |  | Mean Percent by Weight |
| Silicote | $SiO_4$ | 67.90 |
| Alumina Oxide (Alumina) | $AL_2O_3$ | 19.00 |
| Iron Oxide (Iron Oxide) | $Fe_2O_3$ | .05 |
| Calcium Oxide (Calcia) | CaO | 1.60 |
| Magnesium Oxide (Magnesia) | MgO | TR |
| Sodium Oxide (Soda) | $Na_2O$ | 6.70 |
| Potassium Oxide (Potash) | $K_2O$ | 4.80 |
| Loss On Ignition | L0.1 | 0.2 |
| Free Crystalline Silica | $SiO_2$ | <8.0 |

The selected soda feldspar provides an effective means of introducing alumina and alkalis into the batch for forming the vitreous decorative beads. It has low iron oxide levels and high soda to potash ratio which affords increased flexibility in sourcing other batch ingredients. The feldspar contribution to the beads improves the thermo and chemical durability and increased resistance to scratching and breaking.

In addition to viscosity, crazing is a critical consideration in developing the ceramic beads or materials for permanent placement in severe freeze/thaw climates. It is the result of stresses at the bead/body interface caused by differences in thermo expansion between the bead and the body. At firing temperatures, the bead is liquid. The bead can move around to accommodate the body. As the bead cools, its viscosity increases until it no longer follows the body. The set point is the temperature at which this occurs and the stress build-up begins. To avoid the stress build-up in certain situations, one or more frits are utilized with low thermal expansion and suitable melting temperatures.

The frits selected for use with the present invention are available from Pemco Corp. of Baltimore, Md. and are identified as follows:

|  | P-930 | P-4K05 | P-4N57 | P3T928 |
|---|---|---|---|---|
| $K_2O$ (Potash) |  | 0.2 | 0.5 |  |
| $Na_2O$ (Soda) | 4.3 | 6.2 | 7.1 | 8.1 |
| CaO (Calcia) | 5.4 | 5.7 |  | 1.6 |
| MgO (Magnesia) |  |  |  | 0.2 |
| SrO (Stronia) | 17.3 |  |  |  |
| ZnO (Zincite) |  | 1.2 |  | 0.2 |
| $Al_2O_3$ (Alumina) | 4.1 | 6.2 | 6.8 | 5.8 |
| $B_2O_3$ (Boric Oxide) |  | 12.6 | 19.1 | 18.2 |
| $SiO_2$ (Silica) | 52.3 | 60.0 | 66.5 | 65.9 |
| ZrO2 (Zirconia) | 1.2 | 7.9 |  |  |

-continued

|  | P-930 | P-4K05 | P-4N57 | P3T928 |
|---|---|---|---|---|
| Glass Trans | 605.9° C. | 582.0° C. | 527.5° C. | 558° C. |
| *Fusion Temp | 975° C. | 1130° C. | 1130° C. | 950° C. |
| **CTE (×10) | 6.8 | 6.0 | 5.3 | $6.5 \times 10^{-6}/°$ C. |

The frits identified above when used in a batch to be subsequently described will be premelted to a glass, will soften when remelted and at temperatures much lower then when feldspar melts. The frits permit the silica beads to be made at a lower temperature then would be required for feldspar alone. Frit P-4K05 has the additional benefit of providing opacifiction of the bead which results in a bright white or tint (when colorant is added). Frit P-930 includes strontia which enhances the quality of the colorant added to the batch used in making the beads.

Frit P-4K05 along with certain other frits may be utilized to minimize running which occurs at low temperature. The zirconia in the frit retards runniness and a small amount will improve durability. It will also affect the brightness of the colors. Brightness is related to gloss and to the refractive index. The higher the gloss and the higher the refractive index, the brighter the bead will be. In a color, it is also related to chroma or purity of color (or absence of grayness). Brightness really refers to color in contrast to its surroundings as perceived by human response.

The hardness of glass is 5½ on Mohs' Scale of Hardness and is not sensitive to composition change. The shape of the product is important in resistance to breakage and the preferred shape is a sphere or a segment of a sphere. The beads as they approach the spherical shape are hard to break. The use of zircon or zirconia ($ZnO_2$) in the mix will increase the hardness of the resulting bead.

In developing the beads of the present invention, the smallest beads tested were in the range between ⅛ inch and ½ inches in the largest dimension after the first firing or formative firing. Beads smaller than this range were very difficult to handle and were not tested. It was found that beads measuring between ⅛ inch and 2 inches in the largest dimension worked very well when pressed into a horizontal surface. It was found that beads measuring in the range from ⅛ inch to ½ inch worked very well when pressed into a vertical surface with the ½ inch limitation being the largest which could be used satisfactorily. Larger beads tended to run too much when pressed into a vertical surface.

The following are five examples of combination of the feldspar and frits and one example of 100% feldspar used for the various applications. The percentages described herein are for purposes of approximate description and not limitation.

| Example: | Feldspar | Frits |
|---|---|---|
| A | 72.5% Kona F-4 Soda Feldspar | 27.5% P4K05 |
| B | 75% Kona F-4 Soda Feldspar | 15% of P930 |
|  |  | 10% of P4N57 |
| C | 100% Kona F-4 Soda Feldspar | 0% |
| D | 87.5% Kona F-4 Soda Feldspar | 12.5% P930 |
| E | 50% Kona F-4 Soda Feldspar | 50% of P930 |
| F | 70% Kona F-4 Soda Feldspar | 30% P3T928 |

After the materials or minerals for each batch are weighed, as an example, a batch of 1,000 grams, and is accumulated in a mixing container, the ingredients or minerals are mixed for two minutes until the ingredients are integrated. After the mixing operation, the mixed materials are placed through an 80 mesh sieve. The screening operation may be repeated in certain instances. The only time when the mixed ingredients or batch materials are not sieved is when a speckled complexion is being sought after.

The raw ingredients are subjected first to a formative fire in which containers or pots made of a clay compatible with the projected firing temperatures are used. The sieve batch of minerals or ingredients in powered state to be fired in one color is placed in one pot or container and fired as described below. After the firing, the hardened batch is removed from the container and broken into pieces, bits or forms of desired size. Within the mass, there is usually a variety of fired consistency from glassy to powder. If certain forms or pieces are too soft and can not be easily broken, such pieces are introduced to a further firing at a slightly higher temperature and later on subjected to the breaking apart operation or process.

After formation firing, breaking and sieving, the hardened forms are treated in one of two ways. First the hardened forms may be embedded in forms of unfired, plastic clay or related structural clay products and fired to final maturing temperature of the batch material being utilized. This second firing increases over time the temperature to a range from 1825° F. to 2200° F. thereby transforming the hardened forms into generally spherical forms.

Alternatively, the hardened forms may be placed on a kiln shelf washed kiln water (a 50/50% mix of Edgar Plastic Kaolin and Flint) and fired as independent units to be later embedded in the mortar of masonry construction or other plastic material which will mature at ambient temperature.

In all final firings, the kilns are allowed to cool to 200° C. (392° F.) before cracking the door of the kiln, and to 100° C. (212° F.) before opening the kiln door in order to avoid crazing and breaking of the bead.

The following procedures and methods were employed in preparing the decorative vitreous beads according to Examples A–F inclusive:

Making a Batch of Recipe Beads of Example A:

1. Weight out 1000 grams in the following materials and proportions:

27.5% P4K05P
    72.5% F-4.
    Add colorants as desired.
2. Mix by hand for two minutes.
3. Sieve twice through an 80 mesh sieve.
4. Put into an earthenware ceramic container of at least 150 cubic inches. The more surface area in this container the better.
5. Fire on the following schedule Ramp 150° F./hour
    To 600° F.
    Continue with ramp full power
    To 1755° F.
    End Firing.
6. Release the fired mixture block on to a very hard surface, such as a block of granite.
7. Break into small chunks or pieces of ⅛ to 2" in largest dimension.
8. Embed the chunks or pieces into forms made of a still plastic clay, one which will be mature at 2100° F. Dry thoroughly.
9. Fire on the following schedule Ramp 150° F./hour
    To 600° F.

Making a Batch of Recipe Beads of Example A: (continued)

Continue with ramp full power
To 2100° F.
End firing.

Example A beads are the most consistently well-rounded and hard of all of the examples described herein. When colorants are used, the results most often (but not always) are tints and inclined towards the pastel because of the zirconium in the recipe or batch.

Making a Batch of Recipe Beads of Example B:

1. Weigh out 1000 grams of the following materials and portions:

75% F-4
   15% 4N57
   10% P930
   Add colorant as desired.
2. Dry mix for two minutes. Sieve twice through 100 mesh.
3. Put into a fired unglazed earthenware ceramic container of at least 150 cubic inches. The more surface area in this container the better.
4. Fire on the following schedule Ramp 150° F./hour
   To 600° F.
   Continue
   Ramp 350° F./hour
   To 1755
   End firing.
5. Release the fired mixture block on to a very hard surface, such as a block of granite.
6. Break into small chunks or pieces of ⅛ inches to 2 inches in largest dimension.
7. Embed the chunks or pieces into forms made of a still plastic clay, one which will be mature at 2100° F. Dry thoroughly.
8. Fire on the following schedule Ramp 150° F./hour
   To 600° F.
   Continue
   Ramp 350° F./hour
   To 2100° F.
   End firing.

The Example B beads are not quite as round as the Example A beads. The colors are more intense in hue than the Example A beads. It is less likely to craze than the Example A recipe due to the lower rate of thermal expansion of the Frit 4N57.

Making a Batch of Recipe Beads of Example C:

1. Weigh out 1000 grams of the following material:
   100% F-4.
   Add colorant as desired.
2. Dry mix for two minutes, if colorant is added.
3. Sieve twice through 80 mesh, if colorant is added.
4. Fill up firing pots with the sieved mixture.
5. Fire on the following schedule
   Ramp 250° F./hour
   To 600° F.
   Continue with ramp full power
   To 2100° F.
   End firing.

Making a Batch of Recipe Beads of Example C: (continued)

6. Release the units from the mold.
7. Embed the units into forms made of a still plastic clay, one which will be mature at 2200° F. Dry thoroughly.
8. Fire on the following schedule
   Ramp 150° F./hour
   To 600° F.
   Continue with ramp full power
   To 2200° F.
   End firing.

The Example C beads are fired to 2200° F. The beads are round and have a tendency to craze too much for exterior application.

Making a Batch of Recipe Beads of Example D:

1. Weigh out 1000 grams in the following materials and proportions:

87.5% F-4
   12.5% P930
   Add colorant as desired.
2. Dry mix for two minutes.
3. Sieve twice through 80 mesh.
4. Put into a kiln-hardy container of at least 150 cubic inches. The more surface area in this container the better.
5. Fire on the following schedule:

Ramp 150° F./hour
   To 600° F.
   Continue with ramp full power
   To 1755° F.
   End firing.
6. Release the fired mixture block and break into small chunks or pieces of ⅛ inch to 2 inches in largest dimension.
7. Embed the chunks into forms made of a still plastic clay, one which will be mature at 2100° F. Dry thoroughly.
8. Fire on the following schedule:

Ramp 150° F./hour
   To 600° F.
   Continue with ramp full power
   To 2100° F.
   End firing.

The Example D beads with colorants added form very intense colors and are not as uniformly round as the Example B beads.

Making a Batch of Recipe Beads of Example E:

1. Weight out 1000 grams in the following materials and proportions:

50% F-4
   50% P930
   Add colorant as desired.
2. Dry mix for two minutes.
3. Sieve twice through 80 mesh.
4. Put into a kiln-hardy container of at least 150 cubic inches. The more surface area in this container the better.
5. Fire on the following schedule:

Ramp 150° F./hour
   To 600° F.
   Continue with ramp full power
   To 1550° F.
   End firing.
6. Release the block of fired mixture and break into small chunks or pieces of ⅛ inch to 2 inches in largest dimension.

-continued

Making a Batch of Recipe Beads of Example E:

7. Embed the chunks into forms made of a still plastic clay, one which will be mature at 1825° F. Dry thoroughly.
8. Fire on the following schedule:

Ramp 150° F./hour
   To 600° F.
   Continue with ramp full power
   To 1825° F.
   End firing.

Creating a Batch of Recipe Beads of Example F.

1. Weigh out 1000 grams in the following materials and proportions:

70% F-4
   30% P3T928
2. Add colorant as desired.
3. Dry mix for two minutes.
4. Sieve twice through 80 mesh.
5. Put into a kiln-hardy container of at least 150 cubic inches. The more surface area in this container the better.
6. Fire on the following schedule:

Ramp 150° F./hour
   To 600° F.
   Continue with ramp full power
   To 1755° F.
   End firing.
7. Release the block of fired mixture and break into small chunks or pieces of ⅛ inch to 2 inches in largest dimension.
8. Arrange the pieces of fire-hardened mixture on kiln shelves well-washed with a wash of 50% Edgar plastic kaolin and 50% flint.
9. Fire on the following schedule:

Ramp 150° F./hour
   To 300° F.
   Continue with ramp full power
   To 2100° F.
   End firing.
10. Collect the loose beads from the shelves of the cooled kiln.
11. Embed the loose beads in the slightly stiffened mortar joints of freshly laid brickwork.

Tests were also completed to determine if Examples A and B beads would work in a variety of clays. Three types of beads were tested in six different clay bodies. The three types of beads were:
  Example A white.
  Example B plus 1% S401 (blue).
  Example B plus 1% S501 (rose).
  The beads were tested in the following six clay bodies:
  RO-62 A commercial studio, Redart, terra cotta sculpture body brought at Rovin Ceramics located in Taylor, Mich. It has a recommended firing range of Cone 08-2. It contains 20% added medium mesh grog.
  RO-23 A commercial studio, Fireclay/Goldart/Redart body bought at Rovin Ceramics located in Taylor, Mich. with a recommended firing range of Cone 6–10. It is quite a satisfactory mature clay at Cone 1 because of its low absorption, 5.4%, and good color.
  Artware Casting Slip A whiteware casting slip brought at Michigan Ceramics located in Wyandotte, Mich.
  Shale Brick from a brick manufacturer.
  Shale (Quarry) Tile from a manufacturer.
  Fireclay Brick from a brick manufacturer.
  In conclusion, the beads worked equally well in six types of clay tested.

To obtain a variety of colors, the following oxides and commercial stains, in specified quantities may be added to individual batches to achieve the desired colors for the decorative, vitreous beads.

Rovin Ceramics of Taylor, Mich., can provide the oxides which were worked with in percentage up to 3%. They are: nickel, chrome, vanadium, copper, cobalt, manganese, ilmenite, iron, praseodymium, and tin.

Stains manufactured by Ferro Corporation of Cleveland, Ohio, Cerdec Corporation of Washington, Pa., General Color and Chemical Company, Inc. of Minerva, Ohio and purchased from Mid-South Ceramic Supply of Nashville, Tenn. were used in percentages of from 0.012% to 3% of the batch recipe. They are S-700, S-402, S-503, S-302, S-301, S-502 and S-602.

Also used were stains manufactured by Mason Color Works, Inc. of East Liverpool, Ohio and purchased from Rovin Ceramics of Taylor, Mich. They were stains #6031, #6129, #6202, #6223, #6236, #6242, #6265, #6266, #6385, #63855 #6388, #6450, #6573 and were used in quantities of from 0.012%–3% of the batch recipe.

Other ceramic stains were purchased from Laguna in City of Industry, Calif. and Ceramic Color and Chemical Supply Co. of Pittsburgh, Pa. and used in percentages of from 0.01 2%–3% of the batch recipe.

Stains obtained from Laguna were #279497, #27496, #23616, #239416. Stains obtained from Ceramic Color and Chemical Supply Co. were #467 and #496.

The addition of one or more colorants to each batch will provide brilliant, clear and lasting colors in the resulting decorative vitreous beads.

The resulting beads were also subjected to the freeze/thaw testing procedures. The following tests were performed on the beads embedded in six clay bodies in order to ascertain their probable hardiness in severe freeze/thaw climates.

Two gallons of distilled water were placed in a stainless steel pot and were brought to a boil. The six embedded clay samples were placed into the boiling water where they remained for one hour. At that time, the samples were taken out of the water and placed directly into the freezer for a minimum of eleven hours or until thoroughly frozen. This cycle was repeated more than forty times. At that time, there was no signs of any sort of deterioration, discoloration, crazing or any other change in the character of the beads as a result of the freeze/thaw test. The testing of the samples is ongoing.

It is believed that bead making process may be used with various firing schedules used with various types of heat, whether generated by gas, electricity, oil or other energy sources. It is believed that temperature for the formative firing will be in a range from 1500° to 2100° which transforms the batch from a powder state to a hardened state. Finally, the final firing have a temperature in the range from 1825° F. to 2200° F. which transforms the hardened forms into generally spherical vitreous forms with brilliant, clear and lasting colors.

The methods disclosed herein for making decorative vitreous beads comprises the steps of mixing together a batch of minerals in powder state comprising by weight 35% to 70% of silica and the remaining oxides by weight from 65% to 30% for a total of 100% taken from the group comprising potash, soda, calcia, strontia, alumina, zinc oxide, boric oxide, zirconia, magnesia and potassium. One or more of the colorants described previously or other oxides and stains may be added to the batch prior to mixing the minerals together. It addition, the batch of ingredients after the mixing has been completed, may be directed through a sieve rated at 45 to 140 mesh. The mixed batch of ingredients or minerals is then placed in a container and is inserted into a kiln. The batch in the container is subjected to a first or formative firing to increase over time the temperature of the batch to be within a range of from 1500° to 2100° F. The formative heat transforms the batch from the powder state to a hardened state. The hardened batch is removed from the container and is broken into hardened forms, with the largest dimension in the range of from ½" to 2 inches. Most suitable size for handling purposes as indicated previously is where the decorative beads have the largest dimension in the range of ⅛ inch to ½ inch.

The method for making decorative vitreous beads further comprises the steps of sizing the hardened forms after the breaking step has taken place and directing the hardened forms through a sieve which permits the passage of hardened pieces in the range of ⅛ inch to 2 inches.

The method of making the decorative vitreous beads comprises the further step of embedding the hardened forms in a ceramic substrate or other suitable objects or containers and placing same in the kiln and thereafter subjecting the hardened forms in the ceramic substrate to a second firing to increase over time the temperature to a range of from 1825° F. to 2200° F. thereby transforming the hardened forms into generally spherical forms.

As an alternative step of making the decorative beads, the hardened forms may be independently placed on washed shelves of the kiln and thereafter subjecting the hardened forms in the kiln to a second firing or final firing to increase over time the temperature to a range of from 1825° F. to 2200° F. thereby transforming the hardened forms into generally spherical forms.

The method or process further includes the step of pressing the decorative vitreous beads into mortar joints or other plastic material and permitting the plastic material to harden at ambient temperature to thereby retain the decorative beads in position.

The methods further includes the steps of mixing together the ingredients and minerals in the proportions set forth in Examples A–F inclusive.

Drawings

The method steps identified previously are set forth in the flow charts of FIGS. 1 and 2. FIG. 1 does not include the step of adding a colorant as does FIG. 2.

Figure 3:
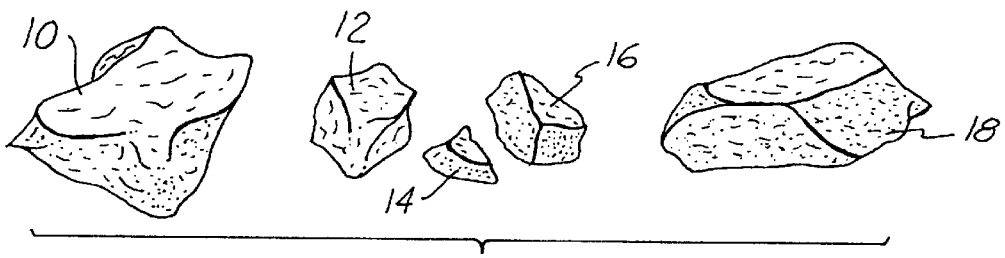
FIG. 3 is a pictorial or perspective view of hardened forms which have been subjected to the formative fire.

FIG. 3 illustrates small hardened piece or forms 10, 12, 14, 16 and 18 after the breaking step has taken place. The forms have been subjected to the first or formative fire. The forms are of irregular shape and configurations and have jagged edges. The forms are of a size, with the largest dimension in the range of ⅛ inch to 2 inches.

Figure 4:
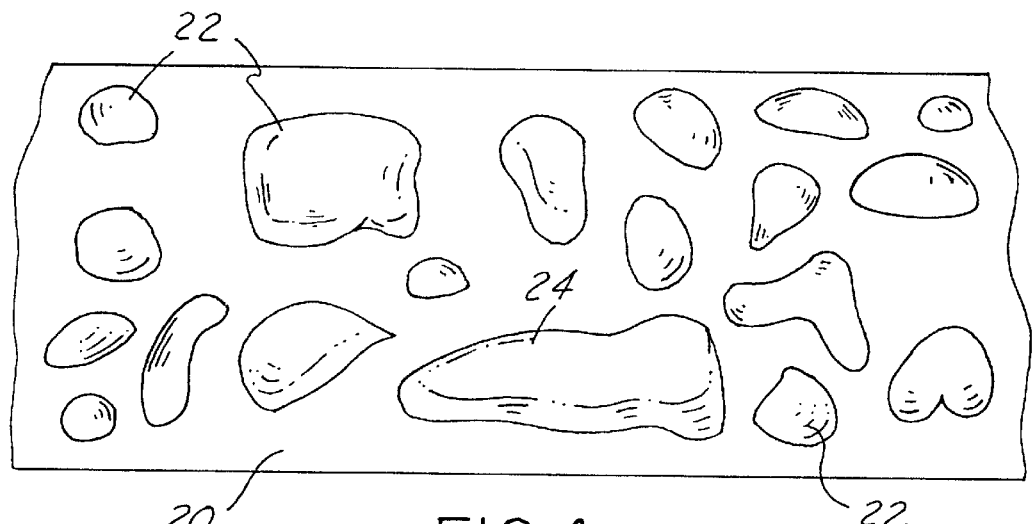
FIG. 4 is a fragmentary plan view of spherical forms embedded in a ceramic substrate after the final fire.

FIG. 4 illustrates a ceramic substrate 20 having thereon decorative beads 22 of different configurations and colors, having many hard, solid, substantially vitreous, unitary bodies which are of generally spherical form. The ceramic substrate 20 and beads have been subjected to the second or final fire. The shape of the beads vary depending on the flow of the bead materials. It should be noted that several adjacent beads, when melted, flowed together as represented by the enlarged bead 24. The beads are somewhat flattened, but still retain a generally spherical form, shape or segment.

Figure 5:
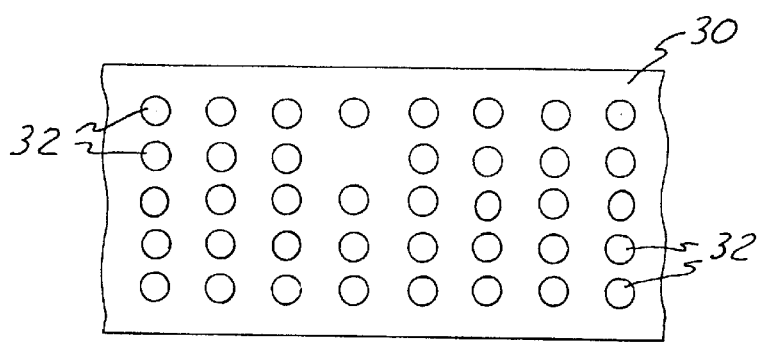
FIG. 5 is a fragmentary plan view of spherical forms embedded in a ceramic substrate after the final fire.

The ceramic substrate 30 of FIG. 5 has embedded therein relatively small decorative vitreous beads 32 of general spherical configuration. The beads have been subjected to the final fire and retain their spherical shape and configuration.

It will be appreciated that various objects, surfaces and bodies may be decorated with the vitreous beads to provide works of art and products for enjoyment by many persons.

Thus, while the invention is claimed in terms of the proportions set forth in the application, it is to be understood that slight variations in the described proportions are included as coming within the scope of the claimed invention.

While the foregoing specification constitutes a detailed description of the decorative bead and methods of making the beads, it is recognized that various modifications thereof will occur to those skilled in the art. Therefore, the scope of the invention is to be limited solely by the scope of the appended claims.

What I claim is:

1. A decorative bead comprising:
   a hard, solid, substantially vitreous, unitary body comprised of silica, and having a generally spherical form, with the largest dimension being in the range between ⅛ inch to 2 inches;
   said body comprising by weight 35% to 70% of silica and the remaining ingredients by weight from 65% to 30% for a total of 100% taken from the group comprising potash, soda, calcia, strontia, alumina, zinc oxide, boric oxide, zirconia, magnesia and potassium.

2. A The decorative bead defined in claim 1, wherein one or more colors are added to said silica body utilizing coloring oxides, carbonates and/or prepared stains.

3. The method of making decorative vitreous beads comprising the steps of:
   (a) mixing together a batch of minerals in powder state yielding by weight 35% to 70% of silica and the remaining oxides by weight from 65% to 30% for a total of 100% taken from the group comprising potash, soda, calcia, strontia, alumina, zinc oxide, boric oxide, zirconia, magnesia and potassium;
   (b) placing the batch in a container and inserting the container into a kiln;
   (c) subjecting the batch in the container to a first firing to increase over time the temperature to be within a range from 1500° F. to 2100° F., thereby transforming the batch from the powder state to a hardened state; and
   (d) breaking the hardened batch into small hardened forms having their largest dimension in the range between ⅛ inch to 2 inches.

4. The method of making decorative vitreous beads according to claim 3, comprising the step of adding a colorant to the batch in step (a) prior to mixing same.

5. The method of making decorative vitreous beads as defined in claim 3, comprising the step of after step (a) has been completed directing the mixed batch of minerals through a sieve in the range of 45 to 140 mesh.

6. The method of making decorative vitreous beads as defined in claim 3, comprising the step of passing the minerals through a sieve in the range of 45 to 140 mesh prior to mixing the minerals together.

7. The method of making decorative vitreous beads as defined in claim 3, comprising the step of sizing the hardened forms by directing same through a sieve which permits the passage of the hardened pieces in the range from ⅛ inch to 2 inches.

8. The method of making decorative vitreous beads as defined in claim 3, comprising the steps of:
   embedding the hardened forms in a ceramic substrate and placing the substrate in the kiln; and
   subjecting the hardened forms in the substrate to a second firing to increase overtime the temperature to a range of from 1825° F. to 2200° F., thereby transforming the hardened forms into generally spherical forms.

9. The method of making decorative vitreous beads as defined in claim 3, comprising the steps of:
   placing the hardened forms independently on washed shelves of the kiln; and
   subjecting the hardened forms in the kiln to a second firing to increase overtime the temperature to a range of from 1825° F. to 2200° F., thereby transforming the hardened forms into generally spherical forms.

10. The method of making decorative vitreous beads as defined in claim 9, including the step of pressing the decorative vitreous beads into mortar joints or other plastic material which hardens at ambient temperature.

11. The method of making decorative vitreous beads as defined in claim 3, wherein the batch of minerals comprises by weight 72.5% of feldspar ($Na_2O.Al_2O_3.6SiO_3$) and a frit containing by weight 27.5%, with the frit containing 0.2% potash, 6.2% soda, 5.7% calcia, 1.2% zincite, 12.6% boric oxide, 60.0% silica, and 7.9% zirconia.

12. The method of making decorative vitreous beads as defined in claim 3, wherein the batch of minerals comprises by weight 75% of feldspar ($Na_2O.Al_2O_3.6SiO_3$) and a first frit containing by weight 15%, with the first frit containing 0.5% potash, 7.1% soda, 6.8% alumina, 19.1% boric oxide and 66.5% silica and a second frit containing by weight 10%, with the second frit containing 4.3% soda, 5.4% calcia, 17.3% strontia, 4.1% alumina, 52.3% silica and 1.2% zirconia.

13. The method of making decorative vitreous beads as defined in claim 3, wherein the batch of minerals comprises by weight 100% of the feldspar ($Na_2O.Al_2O_3.6SiO_3$).

14. The method of making decorative vitreous beads as defined in claim 3, wherein the batch of minerals comprises by weight 87.5% of feldspar ($Na_2O.Al_2O_3.6SiO_3$) and a frit containing by weight 12.5%, with the frit containing 4.3% soda, 5.4% calcia, 17.3% strontia, 4.1% alumina, 52.3% silica and 1.2% zirconia.

15. The method of making decorative vitreous beads as defined in claim 3, wherein the batch of minerals comprises by weight 50% of feldspar ($Na_2O.Al_2O_3.6SiO_3$) and a frit containing by weight 50%, with the frit containing 4.3% soda, 5.4% calcia, 17.5% strontia, 4.1% alumina, 52.3% silica and 1.2% zirconia.

16. The method of making decorative vitreous beads as defined in claim 3, wherein the batch of minerals comprises by weight 70% of feldspar ($Na_2O.Al_2O_3.6SiO_3$) and a frit containing by weight 30%, with the frit containing 8.1% soda, 1.6% calcia, 0.2% magnesia, 0.2% zincite, 5.8% alumina, 18.2% boric oxide and 65.9% silica.

17. The method of making decorative vitreous beads according to claim 5, comprising the step of adding a colorant to the batch before placing the batch in the container.

18. A decorative bead comprising:
   a hard, solid, substantially vitreous, unitary body comprised primarily of silica, and having a generally spherical form, with the largest dimension being in the range between 1/8 inch to 2 inches;
   said body being made from 100% soda feldspar.

19. A decorative bead comprising:
   a hard, solid, substantially vitreous, unitary body comprised primarily of silica, and having a generally spherical form, with the largest dimension being in the range between 1/8 inch to 2 inches;
   said body being made from 87.5% by weight of soda feldspar (Na2O.Al2O3.6SiO3) and 12.5% by weight of a frit containing 4.3% soda, 5.4% calcia, 17.3% strontia, 4.1% alumina, 52.3% silica and 1.2% zirconia.

20. A decorative bead comprising:
   a hard, solid, substantially vitreous, unitary body comprised primarily of silica, and having a generally spherical form, with the largest dimension being in the range between 1/8 inch to 2 inches;
   said body being made from 50% by weight of soda feldspar ($Na_2O.Al_2O_3.6SiO_3$) and a 50% by weight of a frit containing 4.3% soda, 5.4% calcia, 17.5% strontia, 4.1% alumina, 52.3% silica and 1.2% zirconia.

21. A decorative bead comprising:
   a hard, solid, substantially vitreous, unitary body comprised primarily of silica, and having a generally spherical form, with the largest dimension being in the range between 1/8 inch to 2 inches;
   said body being made from 70% by weight of soda feldspar ($Na_2O.Al_2O_3.6SiO_3$) and 30% by weight of a frit containing 8.1% soda, 1.6% calcia, 0.2% magnesia, 0.2% zincite, 5.8% alumina, 18.2% boric oxide and 65.9% silica.

22. Decorative vitreous beads being the products of the method of claim 8 and characterized by the beads clear, bright, hard and solid unitary bodies.

23. Decorative vitreous beads being the products of the method of claim 9 and characterized by the beads clear, bright, hard and solid unitary bodies.

* * * * *